M. BRUSSARD.
METALLIC PACKING.
APPLICATION FILED AUG. 11, 1910.
983,201.
Patented Jan. 31, 1911.
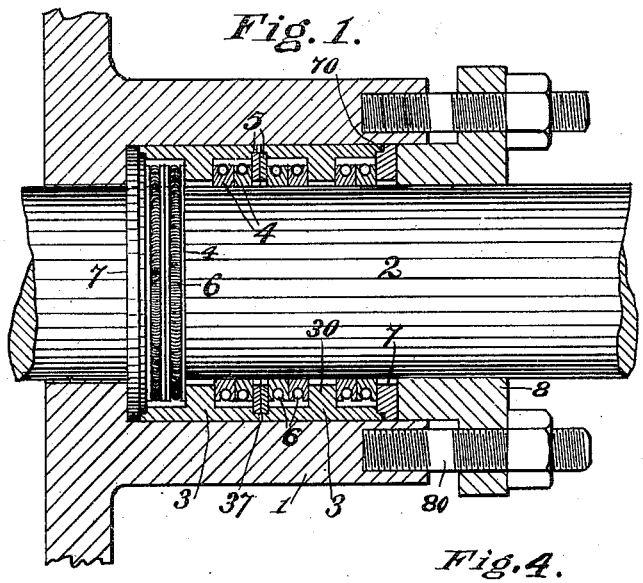
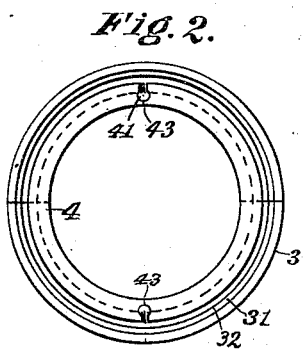
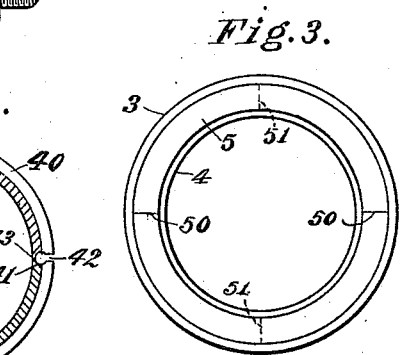
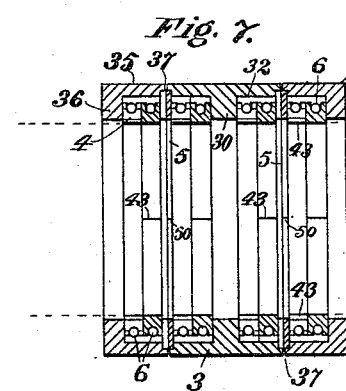
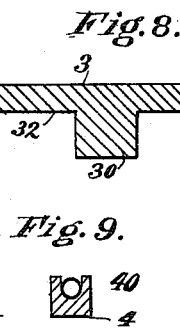
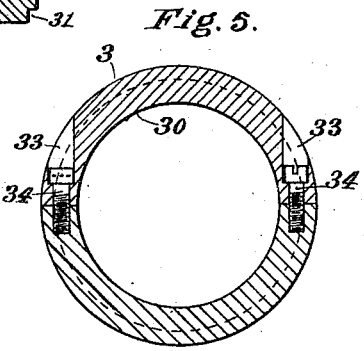
WITNESSES.
Robt. S. Young
M. Daniel
INVENTOR.
Martin Brussard
by Henry L. Reynolds
his attorney.

UNITED STATES PATENT OFFICE.

MARTIN BRUSSARD, OF SEATTLE, WASHINGTON, ASSIGNOR, BY MESNE ASSIGNMENTS, TO BROWN METALLIC PACKING COMPANY, OF SEATTLE, WASHINGTON, A CORPORATION OF WASHINGTON.

METALLIC PACKING.

983,201.      Specification of Letters Patent.      Patented Jan. 31, 1911.

Application filed August 11, 1910. Serial No. 576,755.

*To all whom it may concern:*

Be it known that I, MARTIN BRUSSARD, a citizen of the United States, and resident of the city of Seattle, in the county of King and State of Washington, have invented certain new and useful Improvements in Metallic Packings, of which the following is a specification.

My invention relates to an improvement in metallic packings, and comprises the novel parts and combinations of parts which will be hereinafter described and particularly pointed out in the claims.

The object of my invention is to produce a superior quality of metallic packing and of such design that it may be cheaply made.

In the drawings I have shown my invention in the form which is now preferred by me.

Figure 1 shows my packing in place upon a piston rod and within the gland, the parts being mostly in section. Fig. 2 is an end view of the assembled parts of the packing with the end stop ring removed. Fig. 3 is an end view with the stop ring in place. Fig. 4 is a section taken upon the middle plane of one of the packing rings. Fig. 5 is a section taken through the principal flange of a casing ring. Fig. 6 shows the meeting ends of one of the spring bands. Fig. 7 is a sectional view of an arrangement of packing using slightly different casing rings. Fig. 8 is a section through a side of one of the casing rings. Fig. 9 is a cross section of a packing ring.

In the form of packing shown in Fig. 1 I employ two casing rings 3, each being a duplicate of the other. These casing rings are of a cross section shown in Fig. 8, consisting of a shell having a centrally disposed inwardly projecting flange 30, of an inner diameter slightly greater than that of the rod with which it is to be used. This flange has two purposes or functions to perform; one to serve as a stop ring to prevent passage of the steam lengthwise the packing outside the packing rings, and another, to provide a thickness of metal for the proper securing of the halves together.

For convenience of applying this packing it is necessary that all the parts be made in halves so that they may be placed upon the rod without disturbing any of the engine parts. This feature is shown in Fig. 5. The halves are secured by bolts 34 lying in holes 33.

The casing ring 3 has its surface 32 of such diameter as to receive the packing rings 4 quite loosely, so as to permit free movement of these rings transversely of the rod. In some cases this might not be necessary, but by doing this I secure what may be called a floating support for these rings, that is, a support which permits free sidewise movement of the ring to accommodate for rods which may be untrue in position. In each end of the casing ring 3 is formed a step or recess 31. The length of the surface 32 between this step and the side of the flange 30, is equal, as exactly as feasible to secure, to the thickness of two of the packing rings.

The packing rings are also made in halves to facilitate placing upon the rod. The plan of forming the meeting ends of these halves is clearly shown in Fig. 4, as I now prefer to make them. The complete ring is first drilled through, forming the circular holes 41, which holes are then connected with the outer edge by a cut 42, which cut is preferably of a material width. The inner side of the ring is then cut through at 43, making this cut as thin as possible, as by using a very thin saw.

In turning up the ring a groove 40 is centrally formed in its outer surface for the reception of the spring for holding the parts close upon the rod. This spring, in its preferred form, consists of a finely coiled spring wire 6, having its ends provided with engageable hooks 60 so that it may be placed about the rings and then hooked together. Of these springs I prefer to use eight with each set of packing. These are so placed that the joints alternate in position or so that they "break joints", as may be clearly seen in Fig. 7, in which half the rings have their joints upon the plane of the section and half on the center line, as shown at 43. The same principle of breaking joints is followed with the stop rings and all other parts.

In the step recesses 31, at the ends of the casing rings 3, are placed stop rings 5. These rings are in the form of an annular cut from a thin plate and then divided diametrically in two parts. The thickness of these stop rings is preferably made sufficiently greater than the depth of the step recesses 31, that pressure applied in the direction of the length of the rod will hold the rings firmly against the bottom of the step 31 and not bind the packing rings 4 or be applied directly to the ends of the casings 3. In this way leakage through the joints between the casing rings 3 is prevented. Where the two casing rings 3 join I use two of these stop rings, placed so that they break joints. At the ends which are at the ends of the set, I use a ring 7, which is the same except that it is made heavier and overlaps the ends of the rings 3. In the form shown in Fig. 7 I employ one section 3 and two end sections 35 which are the same as would be a section 3 if a cut were made at one side of the central flange 30. These sections 35 are placed at the ends facing inward. When these are used the end stop rings 7 are omitted.

What I claim as my invention is:

1. A metallic packing comprising a casing having a ring-retaining flange inward from an end, the said end having a stepped recess or stop-ring seat, packing rings adapted to loosely fit within said casing and of an aggregate thickness which brings the last one flush with the bottom of said stepped recess, and a stop ring seating in said stepped recess and of an interior diameter slightly greater than the inner diameter of the packing rings.

2. A metallic packing comprising a casing having a ring-retaining flange inward from an end, the said end having a ring-retaining seat therein, packing rings adapted to loosely fit within said casing and of an aggregate thickness which brings the last one flush with the bottom of said ring seat, and a stop ring fitting said seat and of an interior diameter slightly greater than the interior diameter of the packing rings and of a thickness exceeding the depth of the ring seat, whereby end pressure is applied through said stop ring.

3. A metallic packing comprising a casing separable upon a diametrical plane and having a stop flange formed therewith having an opening somewhat larger than the rod to which it is to be applied, and having a ring-seat recessed in its end, packing rings divided diametrically and adapted to fit loosely within said casing and having a peripheral groove, a coiled wire spring within said groove, said rings being of a thickness to accommodate a plurality thereof between the stop flange and the base of the ring-seat, a diametrically divided stop ring seated in said ring seat and overlapping the sides of the adjacent ring, said stop ring being thicker than the depth of said seat.

In testimony whereof I have hereunto affixed my signature at Seattle, Washington, this 6th day of August, 1910.

MARTIN BRUSSARD.

Witnesses:
 HENRY L. REYNOLDS,
 G. A. SPENCER.